Patented Mar. 24, 1925.

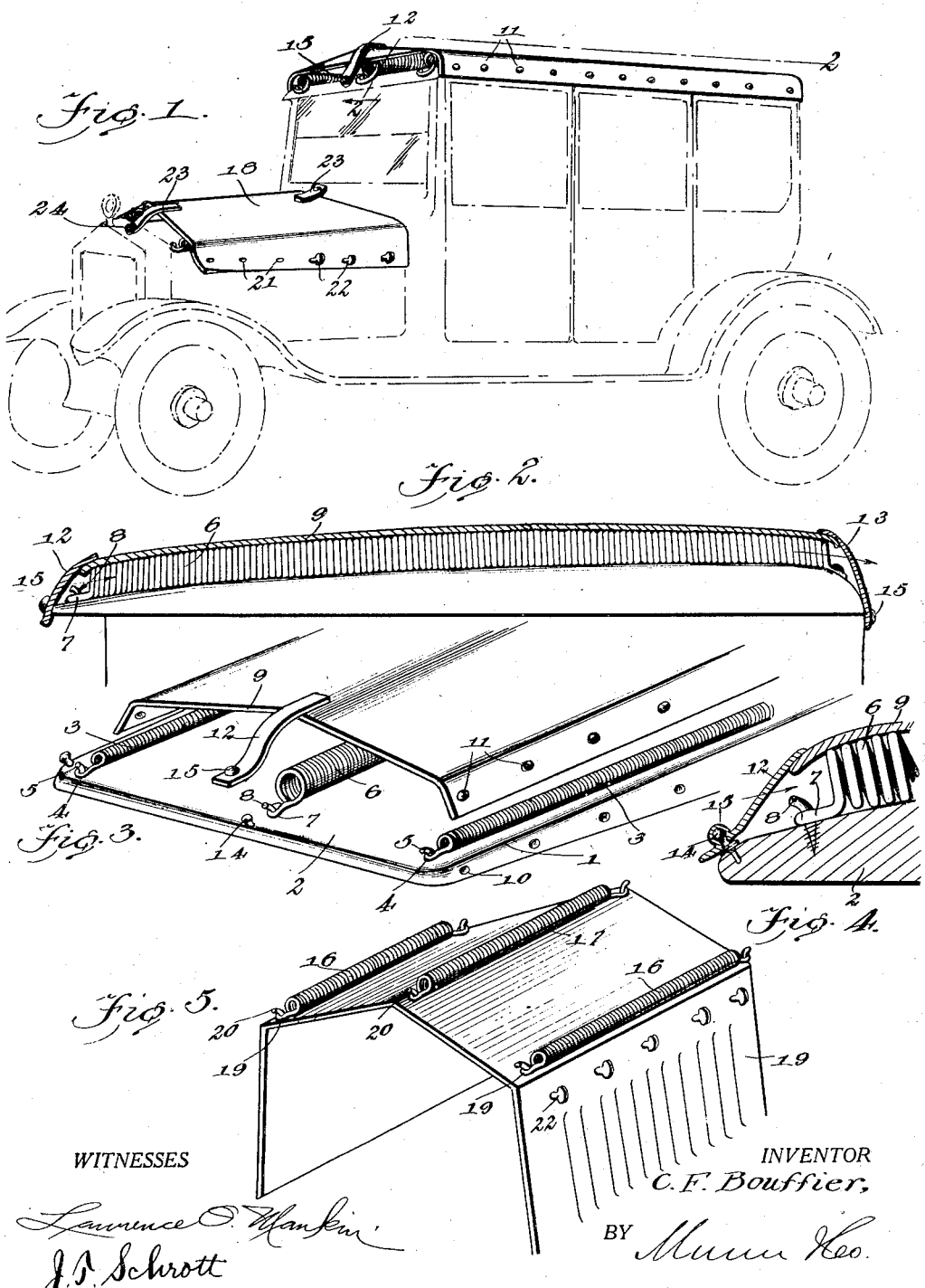

1,530,540

UNITED STATES PATENT OFFICE.

CHARLES FREDERICK BOUFFIER, OF BOISE, IDAHO.

VENTILATING COVER FOR VEHICLES.

Application filed September 29, 1923. Serial No. 665,699.

*To all whom it may concern:*

Be it known that I, CHARLES F. BOUFFIER, a citizen of the United States, and resident of Boise, in the county of Ada and State of Idaho, have invented certain new and useful Improvements in Ventilating Covers for Vehicles, of which the following is a specification.

My invention relates to improvements in ventilating covers for vehicles and it consists of the constructions, combinations and arrangements herein described and claimed.

An object of the invention is to provide an attachable cover for vehicle tops, having means for holding it spaced above the top to provide an air passage.

Another object of the invention is to provide a ventilated roof for vehicles, said roof being composed of two members of which one is removable if desired.

Another object of the invention is to provide an attachable ventilating cover adapted particularly for use on closed automobiles, the principles of said cover being adaptable in an attachable covering for the engine hood.

Another object of the invention is to provide a combined ventilating cover and supplemental top, the cover when functioning as last named, serving to protect the interior of the vehicle should the original top leak or be in an otherwise bad condition.

Other objects and advantages will appear in the following specification, reference being had to the accompanying drawing in which—

Figure 1 is a perspective view of a closed automobile illustrating the application of the invention both to the top and engine hood, Figure 2 is a longitudinal section taken substantially on the lines 2—2 of Figure 1, Figure 3 is a detailed perspective view of the front portion of the top, illustrating the various means for fastening both the cover and springs, Figure 4 is an enlarged section showing in detail how the cover is held down by a snap fastener at the front, Figure 5 is a perspective view of the engine hood showing the spacing springs in place.

The purpose of the invention, as already outlined above, is to provide an extra top for a vehicle, in this case an automobile, for the purpose of defining an air passage for ventilating purposes. As shown in Figure 1 the principles of the invention are applicable to the engine hood as well as the automobile top.

Arranged along the longitudinal edges 1 of the automobile top 2 are coil springs 3. The ends of the springs are provided with loops 4 so that they may be fastened on hooks 5 and so hold the springs in place. In applying the springs they will be stretched to a certain extent, the resulting tension of the springs serving to maintain a tight grip between the loops and hooks.

Similarly, a spring 6, laid down the center of the top 2, has loops 7 which are applied to hooks 8. The spring 6 is of a larger diameter than the springs 3, the purpose of this being to give the cover 9 a sufficient pitch to insure rapid draining of water. The cover 9 is laid on the various springs very much on the order of laying a tent over the ridge-pole and side supports.

In order that the cover 9 may be held in place, provision is made of snap fasteners. These comprise members 10, suitably affixed on the sides of the respective top 2, and 11, carried by the side flaps of the cover 9. Upon applying the cover, as stated above, the side flaps are merely drawn down tight and the snap fasteners pressed together. The use of the snap fasteners provides not only an effective method of holding the cover down, but also insures speed in the application of the cover, such being a desirable factor.

If ventilation of the space above the top 2 is to be had it is obviously necessary that the front and back of such space, defined by the cover 9, be open. Thus it is as shown in Figures 1 and 2. However, it is desirable that the front and back of the cover 9 be held down in some way so that the perfect smoothness of the cover be insured. Straps 12 and 13 (Figure 2) serve the purpose. These, too, have snap fasteners 14 and 15. The structure of one of the snap fasteners is shown in detail in Figure 4. In respect to these fasteners it should be understood that the application of the cover 9 does not depend on the exclusive use thereof.

Other means may be employed just as effectively. For example, the turning buttons, known to every automobilist will perhaps serve the purpose even better than snap fasteners. Or, if desired ordinary straps and buckles may be used. The particular mode of fastening the cover down is not material.

In reference to Figure 5 it is to be observed that a pair of side springs 16 and a ridge spring 17 provide the necessary spacers for holding the cover 18 (Figure 1) above the engine hood 19. The space thus provided adds a valuable ventilating feature to the engine hood.

The opposite ends of the springs are bent into loops 19 which are applied to hooks 20 on the hood. In this instance the cover 18 is shown to be provided with metal grommets 21 which are suitably slotted to receive the turning buttons 22. These are shown here merely to illustrate the variation in the fastening means mentioned before.

The cover 18 may also be held down at the front and back by means of straps 23 and fastening means 24. The purpose of the cover 18 is to provide a space through which air may pass to assist in conducting away the heat of the engine. It is to be observed that the side flaps of the cover 18 do not extend over the customary ventilating louveres of the hood.

The cover 9, it is anticipated, will keep the interior of the vehicle cooler in summer and warmer in winter than would be the case were it not used. The cover 9 also serves the valuable purpose of protecting the top 2 should it leak or be otherwise bad. The cover 9 has sufficient pitch, by reason of the larger diameter of the ridge spring 6, to quickly drain water.

While the construction and arrangement of the improved ventilating cover is that of a generally preferred form, obviously modifications and changes may be made without departing from the spirit of the invention or the scope of the claims.

I claim:—

1. In combination with a vehicle top, a flexible cover, springs laid lengthwise of the top next to the edges, a ridge spring laid along the center of the top, said springs spacing the cover above the top to provide a ventilating air passage, means by which the ends of the springs are fastened, fastening means for the cover comprising members carried by the longitudinal flaps and complementary members carried by the side of the top, and means for holding the cover down at the front and rear.

2. In combination with a top to be protected, a cover, spacing means including springs situated at lateral edges of said top, similar spacing means including a spring situated at the center of the top, said springs disposing the cover above the top to provide a ventilating air passage, means including hooks applied to the top, means including loops at the ends of each of the springs to be applied to the hooks and thereby hold the springs in position, and complementary fastening means carried by the longitudinal flaps of said cover and by adjacent portions of said top to hold the cover down, and means for also holding the cover down at the front and rear.

CHARLES FREDERICK BOUFFIER.